(12) United States Patent
Baumgaertner

(10) Patent No.: US 10,503,166 B2
(45) Date of Patent: Dec. 10, 2019

(54) METHOD OF PROCESSING DATA FOR AN AUTOMATED VEHICLE

(71) Applicant: Robert Bosch GmbH, Stuttgart (DE)

(72) Inventor: Rainer Baumgaertner, Pfaffenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/719,943

(22) Filed: Sep. 29, 2017

(65) Prior Publication Data

US 2018/0107212 A1    Apr. 19, 2018

(30) Foreign Application Priority Data

Oct. 17, 2016 (DE) .......... 10 2016 220 197

(51) Int. Cl.
*G05D 1/00* (2006.01)
*G07C 5/08* (2006.01)
*B60W 30/00* (2006.01)
*G05B 19/042* (2006.01)

(52) U.S. Cl.
CPC .......... *G05D 1/0055* (2013.01); *B60W 30/00* (2013.01); *G05B 19/0428* (2013.01); *G05D 1/0077* (2013.01); *G05D 1/0088* (2013.01); *G07C 5/085* (2013.01); *G05B 2219/24182* (2013.01); *G05B 2219/2637* (2013.01); *G05D 2201/0213* (2013.01)

(58) Field of Classification Search
CPC .......... H04L 12/4625; H04L 12/12; H04L 2012/4026; H04L 41/0253; H04L 41/0604; H04L 43/00; H04L 43/028; H04L 43/062; H04L 43/0811; H04L 43/0817; H04L 43/106; B60T 2270/413; B60T 8/885; G06F 11/0739; G06F 11/0757; H04B 17/406; Y02D 50/40; Y02P 90/18
USPC .......... 701/2, 29.2, 36, 469; 702/182, 183; 700/80, 295; 710/305; 709/222; 370/216, 362; 340/3.43, 438, 627; 455/466; 327/1; 1/1
See application file for complete search history.

(56) References Cited

U.S. PATENT DOCUMENTS 5,166,673 A * 11/1992 Herrmann ................ H04B 3/46
340/3.43
5,432,715 A * 7/1995 Shigematsu ........ G06F 11/0748
700/3
5,495,575 A * 2/1996 Hermann ............ G06F 12/0661
709/222

(Continued)

FOREIGN PATENT DOCUMENTS

DE     102014213245 A1    1/2016
GB         2340628 B *   4/2003 ............. H04L 12/12

*Primary Examiner* — David P. Merlino
(74) *Attorney, Agent, or Firm* — Norton Rose Fulbright US LLP; Gerard Messina

(57) ABSTRACT

A method for processing data for an automated vehicle, including operating at least two processing units, the at least two processing units being monitored by a monitoring device having at least two self-monitoring monitoring units. Defined monitoring of the processing units is carried out with the aid of the at least two monitoring units. A master functionality of the monitoring units is assumed by a defined monitoring unit. In the event of a fault of the monitoring unit carrying out the master functionality, the master functionality is taken over by a downstream monitoring unit.

12 Claims, 3 Drawing Sheets

(56) References Cited

U.S. PATENT DOCUMENTS

| | | | | |
|---|---|---|---|---|
| 6,141,610 A * | 10/2000 | Rothert | ................. | G07C 5/008 |
| | | | | 340/438 |
| 2002/0093951 A1 * | 7/2002 | Rupp | ....................... | G05B 9/03 |
| | | | | 370/362 |
| 2002/0116092 A1 * | 8/2002 | Hamamatsu | ............. | H02H 3/05 |
| | | | | 700/295 |
| 2002/0126620 A1 * | 9/2002 | Heckel | ............... | G05B 19/0428 |
| | | | | 370/216 |
| 2003/0023405 A1 * | 1/2003 | Loehr | .................... | B60T 8/885 |
| | | | | 702/182 |
| 2004/0139264 A1 * | 7/2004 | Gros | .................. | H04L 12/4625 |
| | | | | 710/305 |
| 2005/0090978 A1 * | 4/2005 | Bathory | ............... | G08G 5/0013 |
| | | | | 701/469 |
| 2006/0136648 A1 * | 6/2006 | Gros | .................. | H04L 12/4625 |
| | | | | 710/305 |
| 2007/0135975 A1 * | 6/2007 | Stange | ................. | B64C 13/503 |
| | | | | 701/3 |
| 2009/0119437 A1 * | 5/2009 | Hilscher | .............. | H04L 12/407 |
| | | | | 710/305 |
| 2010/0225493 A1 * | 9/2010 | Zishaan | ................... | F24F 11/30 |
| | | | | 340/627 |
| 2010/0262264 A1 * | 10/2010 | Hahniche | ........... | G05B 19/4184 |
| | | | | 700/80 |
| 2010/0299024 A1 * | 11/2010 | Muders | .................... | B60T 7/042 |
| | | | | 701/36 |
| 2011/0010023 A1 * | 1/2011 | Kunzig | ..................... | G01S 5/16 |
| | | | | 701/2 |
| 2014/0032173 A1 * | 1/2014 | Kida | ................... | G06F 11/0751 |
| | | | | 702/183 |
| 2014/0052325 A1 * | 2/2014 | Naegele | ............. | G06F 11/0739 |
| | | | | 701/29.2 |
| 2015/0141064 A1 * | 5/2015 | Bjorn | ................... | G01R 15/246 |
| | | | | 455/466 |
| 2015/0193341 A1 * | 7/2015 | Ye | ........................... | G06F 9/522 |
| | | | | 711/202 |
| 2016/0131696 A1 * | 5/2016 | Forster | ................. | G01R 31/088 |
| | | | | 327/1 |
| 2017/0144704 A1 * | 5/2017 | Robinson | ................. | B60Q 9/00 |
| 2017/0244498 A1 * | 8/2017 | Langguth | .............. | H04W 12/12 |
| 2017/0285613 A1 * | 10/2017 | Asai | ...................... | G05B 19/406 |
| 2017/0334678 A1 * | 11/2017 | Sonnenmoser | ....... | B66B 1/3438 |
| 2017/0361852 A1 * | 12/2017 | Topp | ................ | B60W 50/0205 |
| 2018/0321669 A1 * | 11/2018 | Haas | ....................... | F02D 41/22 |
| 2019/0016443 A1 * | 1/2019 | Alfred | ................... | B64C 13/503 |

* cited by examiner

METHOD OF PROCESSING DATA FOR AN AUTOMATED VEHICLE

CROSS REFERENCE

The present application claims the benefit under 35 U.S.C. § 119 of German Patent Application No. DE 102016220197.2 filed on Oct. 17, 2016, which is expressly incorporated herein by reference in its entirety.

FIELD

The present invention relates to a method for processing data for an automated vehicle. In addition, the present invention relates to a device for processing data for an automated vehicle.

BACKGROUND INFORMATION

Driver assistance systems for highly automated driving are currently in the initial stage. Provisions regarding a functional safety concept frequently exist in only very rudimentary forms and are largely still safeguarded via human intervention. However, a market launch requires functional safety concepts that are fully or partially fail-operational, meaning that critical errors are detected and a minimally required function is able to continue to be safely carried out even in the case of a fault.

Current systems in the automotive environment are largely designed to be fail-safe, which means that critical faults are detected and the function is brought into a safe state.

Systems for highly automated driving are technically complex. They require high processing power and a large memory. The complete implementation of such large systems in the form of fail-safe or fail-operational systems is currently possible only with great difficulty. In addition, no highly integrated components that satisfy the required safety demands while simultaneously providing high processing power are in existence. Known electronic consumer components usually do not meet any greater demands with regard to functional safety.

German Patent Application No. DE 10 2014 213 245 A1 describes a method for processing data for a driving function of a vehicle is known. Here, operations are synchronized at the data level rather than at the cycle level.

SUMMARY

It is an object of the present invention to provide an improved method for operating an automated vehicle.

According to a first aspect of the present invention, an example method is provided for processing data for an automated vehicle. The method includes:

Operating at least two processing units, the at least two processing units being monitored by a monitoring device having at least two self-monitoring monitoring units, Defined monitoring of the processing units being carried out with the aid of the at least two monitoring units;

A master functionality of the monitoring units being assumed by a defined monitoring unit; and in a fault case of the monitoring unit that is executing the master functionality, the master functionality is taken over by a downstream monitoring unit.

The use of at least two monitoring units advantageously increases an availability of the processing units, and thus an availability of the system as a whole. The monitoring units are fail-safe and therefore recognize when they exhibit a fault. In such a case the master functionality is able to be seamlessly transferred to a respective downstream monitoring unit.

According to a second aspect, the objective is achieved by a device for processing data for an automated vehicle, the device having a defined number of processing units;

at least two monitoring units by which the processing units are able to be monitored;

a master functionality being assumed by one of the monitoring units, and in the event that the master monitoring unit exhibits a fault, the master functionality is taken over by a downstream monitoring unit.

Advantageous further developments of the method are the subject matter of the dependent claims.

An advantageous further development of the present method provides that monitoring of the processing units is carried out by both monitoring units in parallel. This makes it possible to provide high availability of the system in the event that a change in the master functionality takes place.

Another advantageous further development of the present method provides that the downstream monitoring units signal to the monitoring unit executing the master functionality whether they are fault-free. This, too, contributes to a high level of redundancy of the system as a whole.

Another advantageous further development of the present method provides that the monitoring units synchronize the processing units. This advantageously optimizes a processing power of the processing units, and the monitoring quality is improved since, for example, a timing on the processing units is directly determined by the safe monitoring unit.

An additional advantageous further development of the present method is characterized in that the monitoring units compare whether the results of the processing units are identical. This contributes to a high system power of the processing units, and the quality of the monitoring is improved, for instance because a comparison result is calculated in a reliable manner in the monitoring unit.

Another advantageous further development of the method is characterized by the fact that in the event of a deviation between a result of one of the processing units and a result of other processing units, the processing unit supplying the deviating result will be deactivated. This advantageously increases a functional reliability of the method according to the present invention.

Another advantageous further development of the present method provides that only one monitoring unit in each case triggers all of the processing units, thereby simplifying a function principle of the system as a whole.

An additional advantageous further development of the method provides that each one of the monitoring units has a multiplexer, and a data channel of the monitoring unit is developed with the aid of the multiplexers. In this way, a data flow of the monitoring unit is optimized, so that less work is required by downstream units for processing the data.

Below, the present invention is described in detail with additional features and advantages on the basis of a plurality of figures. Identical or functionally equivalent elements bear the same reference numerals. For better clarity, it may be the case that not all of the reference numerals have been added in all of the figures.

The described method features analogously result from correspondingly described device features, and vice versa. This specifically means that features, technical advantages and specific embodiments with regard to the method for processing data for an automated vehicle similarly result from corresponding specific embodiments, features and advantages of the device for processing data for an automated vehicle, and vice versa.

DETAILED DESCRIPTION OF EXAMPLE EMBODIMENTS

In accordance with the present invention, a method is provided for processing data for an automated vehicle with greater availability.

A conventional approach toward that end is an M-out of-N system that holds $M \leq N,$ where:
M . . . is the number of processing units that must minimally agree in the result
N . . . is the number of processing units.

Here, N processing units are realized in parallel. A monitoring unit in the form of a comparator/decider compares the results of all N processing units. If M results are identical, then the comparator/decider sets a system status to fault-free. In addition, the result of the M processing units providing a matching result is output as the result of the M-out of-N system. If fewer than M results are identical, then the status of the system is set to faulty. In the fault case, for instance, a defined result is then able to be output and the error treatment be started.

Figure 1:
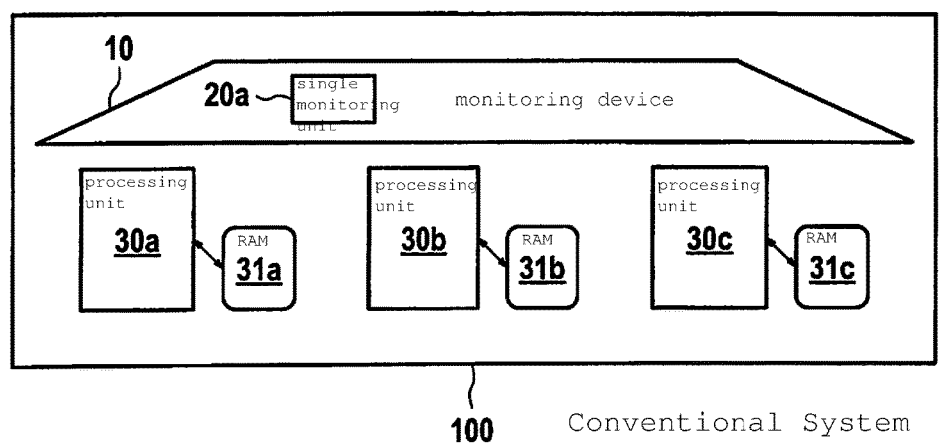
FIG. 1 shows an illustration of a basic method of functioning of a conventional method for processing data for an automated vehicle.

FIG. 1 shows a conventional system, which is realized according to the above principle, the system including a monitoring device 10 that has a single monitoring unit 20a, preferably a microcontroller. System 100 includes three processing units 30a . . . 30c, each being functionally interconnected with a RAM 31a . . . 31c.

An availability of individual components of a redundant computer network is primarily defined via its components.

In the method described in German Patent Application No. DE 10 2014 213 245 A1, the availability with regard to the processing units may be increased by using a plurality of processing units. For instance, instead of M=2 and N=2, one more processing unit may be used, i.e. M=2, and N=3. This has a positive effect on the availability, which may be mathematically expressed in the following way:

$$\text{Availability (2 out of 3)} = R = R\varepsilon * \hat{}(R\alpha\beta 3 + 3R\alpha\beta \hat{}2(1-R\alpha\beta)) \quad (1)$$

with:
$R\alpha\beta$ . . . availability of the processing units
$RE\varepsilon$ . . . availability of the comparator/decider/synchronizer.

Thus, it may be gathered from formula (1) that the availability of the comparator/decider/synchronizer plays an important role in the availability of the system as a whole.

In accordance with the present invention, this restriction is dissolved in such a way that core approaches and advantages of the system described in German Patent Application No. DE 10 2014 213 245 A1 remain unchanged.

The present invention advantageously makes it possible to achieve an increase in an availability of the redundancy system. For this purpose, the number of monitoring units 20 within comparator device 10 is at least doubled and incorporated into the method described in German Patent Application No. DE 10 2014 213 245 A1.

In an advantageous manner, this makes it possible to reduce an availability restriction of the redundancy system with relatively little effort. To do so, the processing units of monitoring device 10 are preferably realized by cost-effective, self-monitoring (i.e. fail-safe) microcontrollers.

Figure 2:
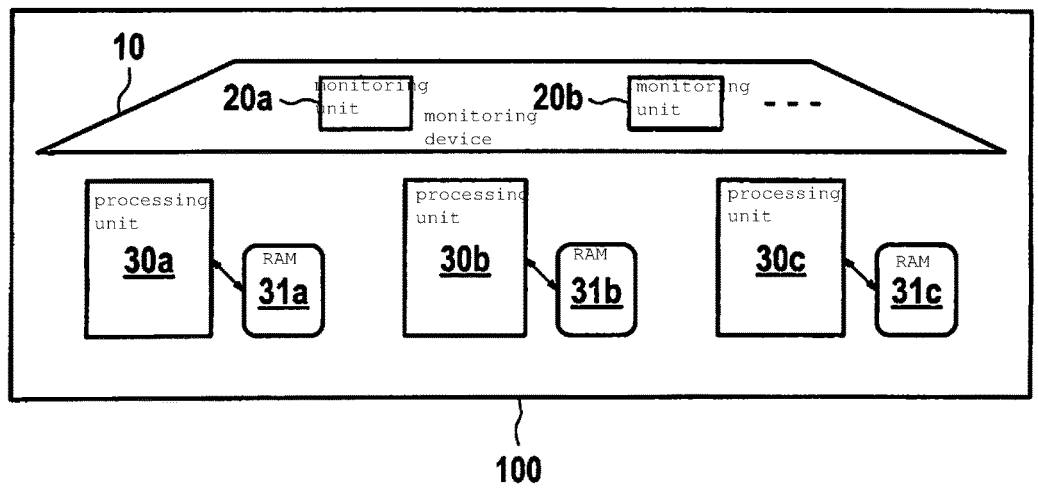
FIG. 2 shows an illustration of a basic method of functioning of a specific embodiment of an example method for processing data for an automated vehicle, in accordance with the present invention.

FIG. 2 shows, by way of example, the structure with the aid of an M=2 and N=3 system 100 realized in this manner.

Monitoring device 10 is exemplarily realized by a monitoring unit 20a, 20b, provided in duplicate, in the form of two microcontrollers for applications in the automotive sector. In principle, however, a realization of monitoring device 10 by three or more processing units 20a . . . 20n, all of them satisfying respectively defined functional safety demands, is also conceivable.

Below, a system 100 having a number N=2 of monitoring units 20a . . . 20n and a number M=3 of processing units 30a . . . 30n will be described by way of example.

Figure 3:
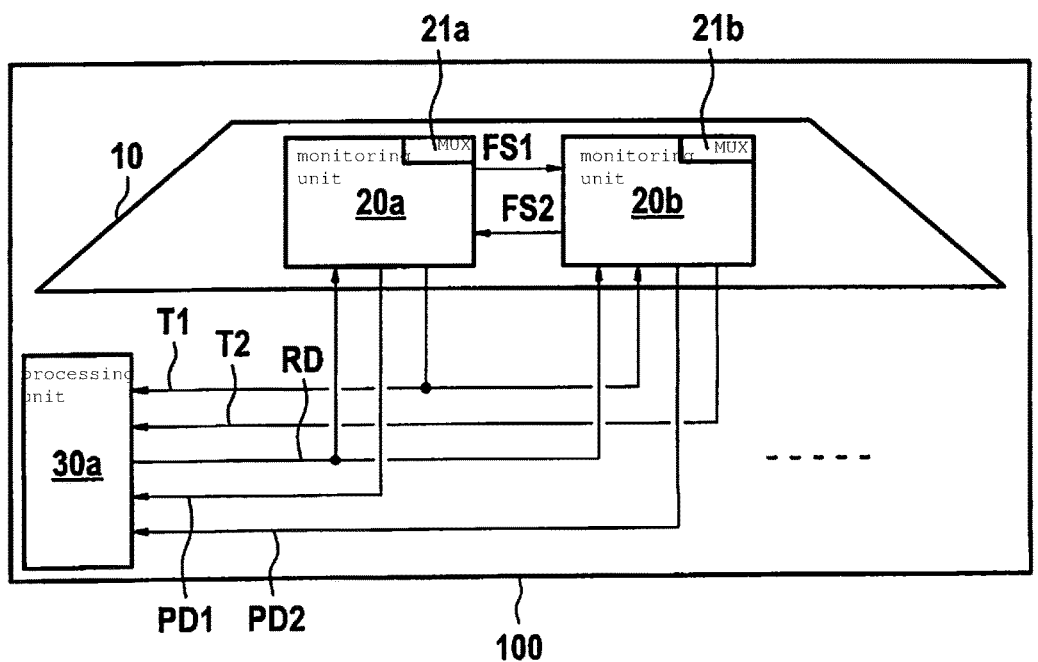
FIG. 3 shows a partial view of FIG. 2 using a higher degree of detail.

FIG. 3 shows a portion of system 100 from FIG. 2 with a greater degree of detail; here, only a single processing unit 30a is exemplarily depicted for the sake of greater clarity. However, it is of course understood that any other numbers N≥2 of monitoring units 20a . . . 20n and M≥2 of processing units 30a . . . 30n are conceivable for proposed system 100.

FIG. 3 shows a first trigger line T1, which is developed between first monitoring unit 20a and first processing unit 30a and via which first monitoring unit 20a triggers first processing unit 30a. In addition, it can be seen that a second trigger line T2, via which first processing unit 30a is triggered by second monitoring unit 20b in the event of a fault of first monitoring unit 20a, is provided between second monitoring unit 20b and first processing unit 30a.

To be seen in addition is a result data line RD for transmitting result data from processing units 30a . . . 30n to monitoring units 20a, 20b, result data line RD being disposed between first processing unit 30a and monitoring units 20a, 20b. This advantageously allows data to be transmitted from processing unit 30a to the two monitoring units 20a, 20b, using only one protocol. Optionally, the use of different protocols or a doubling of interfaces may also be provided toward this end.

In addition, a first process data line PD1 for transmitting process data from first monitoring unit 20a to first processing unit 30a, and a second process data line PD2 for transmitting process data from second monitoring unit 20b to first processing unit 30a are provided. This essentially realizes two independent signal paths from monitoring units 20a, 20b to processing unit 30a, 30b. They may preferably be developed as separate interfaces or, as an alternative, as a single bus interface given suitable bus interfaces.

A separate process data line, synchronization and/or trigger line must be provided for additional processing units 30b . . . 30n (not shown) in system 100 of FIG. 3. As described in German Patent Application No. DE 10 2014

213 245 A1, a plurality of further variants may be provided as interfaces, as briefly described in the following text merely by way of example.

Preferably, a so-called trigger arbiter (not shown), which allows for the synchronization of the two redundant monitoring units 20a, 20b, is disposed in each monitoring unit 20a, 20b. As the case may be, the trigger arbiter generates trigger signals for processing units 30a . . . 30n, reads in trigger signals from other instances, and synchronizes its internal trigger timing to its higher-level master. For this purpose, the trigger arbiter reads in the fail-safe signaling of its higher-level masters.

What is known as fail-safe signaling, by which a respective higher-level monitoring unit 20a . . . 20-n signals its status to a respective downstream monitoring unit 20b . . . 20n, is preferably provided between monitoring units 20a . . . 20n. Still further signaling forms may also be provided for diagnostic and testing purposes. As a minimum, fail-safe signaling between the two monitoring units 20a, 20b is sufficient, but a diagnosability may be reduced in this case.

A communication between processing units 30a . . . 30n and monitoring units 20a . . . 20n may be developed in the following manner:

Preferably, a first monitoring unit 20a initially assumes a master functionality and for this purpose carries out a comparator/decider/synchronization function provided in a normal operation. In the event that first monitoring unit 20a is faulty, monitoring unit 20b situated downstream takes over the master functionality. If monitoring unit 20b is faulty, then downstream monitoring unit 20c (not shown) takes over the master functionality, etc.

This requires the activation of a fail-safe signal FS1 of first monitoring unit 20a, by which the master monitoring unit signals to downstream monitoring units 20b . . . 20n that it is operating without a fault or that it has encountered a fault.

Both monitoring units 20a, 20b execute the comparator/decider/synchronization functionality simultaneously using the same data. For this purpose, the result data of processing units 30a . . . 30n are compared to one another, and in the event that a processing unit 30a . . . 30n supplies a deviating result, it will be excluded from the further process, i.e. deactivated.

The triggers operate in the way already known from DE 10 2014 213 245 A1. In addition it applies that first monitoring unit 20a operates the first trigger via first trigger line T1; in the case of a fault, the trigger functionality for first processing unit 30a is taken over by second monitoring unit 20b. To do so, second monitoring unit 20b must synchronize to the first trigger for as long as first monitoring unit 20a is fault-free.

Monitoring units 20a, 20b must therefore ensure that an unambiguous triggering of processing units 30a . . . 30n takes place. A simultaneous trigger functionality by two monitoring units 20a, 20b is not provided.

The triggering preferably takes place in an edge-controlled manner, which facilitates an unambiguousness of the triggering. In the event of a malfunction of first monitoring unit 20a shortly before the triggering instant, second monitoring unit 20b will trigger. If first monitoring unit 20a fails shortly after the triggering instant, no triggering of second monitoring unit 20b in this cycle is required yet, but only in the following cycle.

Processing units 30a . . . 30n use process data line PD when the activation of trigger X has been detected (X=1 or X=2).

To ensure that only a single data channel is realized by monitoring device 10 (e.g., for data for a control unit in the motor vehicle), a separate multiplexer 21a . . . 21n, which bundles said data channel, is provided in each monitoring unit 20a . . . 20n.

In an advantageous manner, it is possible to expand system 100 by more than the two instances of monitoring device 10 described in FIG. 3. This is particularly advantageous when high degrees of availability of system 100 are demanded. As described earlier, the mentioned bus and interface lines T1, T2, RD, PD1, PD2 must be expanded accordingly for this purpose, as merely sketched in FIG. 3 for reasons of greater clarity.

The assumption of the master functionality of monitoring units 20a . . . 20n preferably takes place according to a priority. Until it fails, the responsibility of the master falls to first monitoring unit 20a, and then second monitoring unit 20b takes over the master functionality, followed by third monitoring unit 20c, etc., until no master functionality is able to be realized any longer due to a lack of monitoring units.

Preferably, the second, third, fourth, fifth, etc. masters read in all fail-safe outputs FS1 . . . FSn of their higher-level predecessors. A takeover of the master functionality is implemented only when all predecessors have failed.

Figure 4:
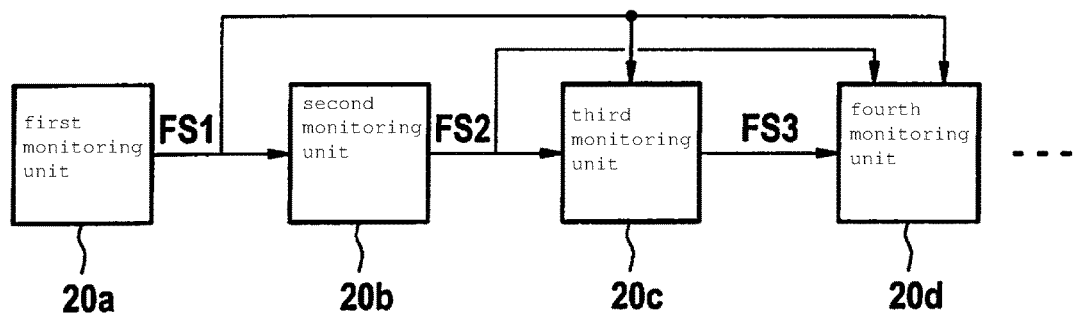
FIG. 4 shows a basic illustration of an interlinked transfer of a master functionality of a monitoring unit.

This is sketched in FIG. 4, where the fail-safe lines of master monitoring units 20a . . . 20c are depicted, through which a chain-type take-over of the master functionality by monitoring units 20a . . . 20c is realized in the final analysis.

The method according to the present invention is advantageously able to be implemented as a software that is running on monitoring units 20a . . . 20n of monitoring device 10. This contributes to a simple adaptability of the method.

Figure 5:
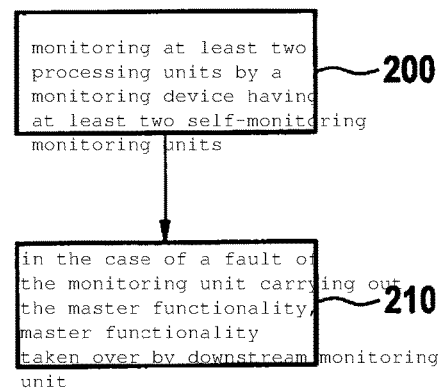
FIG. 5 shows a basic flow diagram to explain a specific embodiment of the example method.

FIG. 5 shows a basic sequence of a specific embodiment of the method according to the present invention.

In a step 200, an operation of at least two processing units 30a . . . 30n is carried out, in which the at least two processing units 30a . . . 30n are monitored by a monitoring device 10 having at least two self-monitoring monitoring units 20a . . . 20n. Defined monitoring of processing units 30a . . . 30n is carried out with the aid of the at least two monitoring units 20a . . . 20n, and a master functionality of monitoring units 20a . . . 20n is assumed by a defined monitoring unit 20a . . . 20n.

In a step 210, in the case of a fault of monitoring unit 20a . . . 20n carrying out the master functionality, the master functionality is taken over by a downstream monitoring unit 20a . . . 20n.

Ultimately, the present invention makes it possible to influence a method of functioning of a driver assistance system of a highly automated motor vehicle in an advantageous manner inasmuch as, for example, an availability of processing power is advantageously increased, thereby increasing a general degree of safety of a highly automated motor vehicle in road traffic.

One skilled in the art will modify the features of the present invention in a suitable manner and/or combine them with one another without departing from the core of the present invention.

What is claimed is:

1. A method for processing data for an automated vehicle, comprising:
   operating at least two processing units, the at least two processing units being monitored by a monitoring device having at least two self-monitoring monitoring units;
   carrying out defined monitoring of the at least two processing units with the aid of the at least two self-monitoring monitoring units, a master functionality of the at least two self-monitoring monitoring units being assumed only by a first one of the at least two self-monitoring monitoring units and not by any others of the at least two self-monitoring monitoring units, wherein each of the at least two self-monitoring monitoring units monitors all of the at least two processing units, the monitoring by each of the at least two self-monitoring monitoring units including receiving result data from each of the at least two processing units and comparing the received result data to one another to determine whether the received result data are identical to each other; and
   in the event of a fault of the first one of the at least two self-monitoring monitoring units carrying out the master functionality, the master functionality is taken over by a second one of the at least two self-monitoring monitoring units which is downstream of the first one of the at least two self-monitoring monitoring monitoring units so that only the second one of the at least two self-monitoring monitoring units assumes the master functionality and none of the others of the at least two self-monitoring monitoring units assumes the master functionality;
   wherein the master functionality includes triggering the at least two processing units to synchronize them.

2. The method as recited in claim 1, wherein monitoring of the processing units is carried out by the at least two self-monitoring monitoring units in parallel to one another.

3. The method as recited in claim 1, wherein downstream ones of the at least two self-monitoring monitoring units signal to a monitoring unit of the at least two self-monitoring monitoring units carrying out the master functionality whether they are fault-free.

4. The method as recited in claim 1, wherein in the event of a deviation between a result data from one of the at least two processing units and result data from others of the at least two processing units, a processing unit of the at least two processing units supplying the deviating result data is deactivated.

5. The method as recited in claim 1, wherein each of the at least two self-monitoring monitoring units has a multiplexer, and a data channel of the each of the at least two self-monitoring monitoring devices is developed with the aid of the respective multiplexer.

6. The method as recited in claim 1, wherein the second one of the at least two self-monitoring monitoring units synchronizes to the triggering for as long as the first one of the at least two self-monitoring monitoring units is fault free and the master functionality is assumed by the first one of the at least two self-monitoring monitoring units.

7. A device for processing data for an automated vehicle, comprising:
   at least two processing units;
   at least two monitoring units with the aid of which the at least two processing units are monitored;
   wherein a master functionality is assumed only by a first one of the at least two monitoring units and not by any others of the at least two monitoring units, wherein each of the at least two monitoring units monitors all of the at last two processing units, the monitoring by each of the at least two monitoring units including receiving result data from each of the at least two processing units and comparing the received result data to one another to determine whether the received result data are identical to each other, and in the event that the first one of the at least two monitoring unit assuming the master functionality is faulty, the master functionality is taken over by a second one of the at least two monitoring units which is downstream of the first one of the monitoring units so that only the second one of the at least two monitoring units assumes the master functionality and none of the others of the at least two monitoring units assumes the master functionality;
   wherein the master functionality includes triggering the at least two processing units to synchronize them.

8. The device as recited in claim 7, wherein interface buses are separately developed between the at least two processing units and the at least two monitoring units.

9. The device as recited in claim 7, wherein interface buses between the at least two processing units and the at least two monitoring units are integrated in a single bus.

10. The device as recited in claim 7, wherein the second one of the at least two monitoring units synchronizes to the triggering for as long as the first one of the at least two monitoring units is fault free and the master functionality is assumed by the first one of the at least two monitoring units.

11. A non-transitory computer-readable data carrier on which program code is stored, the program code for processing data for an automated vehicle, the program code, when executed on an electronic monitoring device, causing the electronic monitoring device to perform:
   operating at least two processing units, the at least two processing units being monitored by a monitoring device having at least two self-monitoring monitoring units;
   carrying out defined monitoring of the at least two processing units with the aid of the at least two self-monitoring monitoring units, a master functionality of the at least two self-monitoring monitoring units being assumed only by a first one of the at least two self-monitoring monitoring units and not by any others of the at least two self-monitoring monitoring units, wherein each of the at least two self-monitoring monitoring units monitors all of the at least two processing units, the monitoring by each of the at least two self-monitoring monitoring units including receiving result data from each of the at least two processing units and comparing the received result data to one another to determine whether the received result data are identical to each other; and
   in the event of a fault of the first one of the at least two self-monitoring monitoring units carrying out the master functionality, the master functionality is taken over by a second one of the at least two self-monitoring monitoring units which is downstream of the first one of the at least two self-monitoring monitoring units so that only the second one of the at least two self-monitoring monitoring units assumes the master functionality and none of the others of the at least two self-monitoring monitoring units assumes the master functionality;
   wherein the master functionality includes triggering the at least two processing units to synchronize them.

12. The non-transitory computer-readable data carrier as recited in claim 11, wherein the second one of the at least two self-monitoring monitoring units synchronizes to the triggering for as long as the first one of the at least two self-monitoring monitoring units is fault free and the master functionality is assumed by the first one of the at least two self-monitoring monitoring units.

* * * * *